(12) United States Patent
Chin et al.

(10) Patent No.: US 8,968,154 B2
(45) Date of Patent: Mar. 3, 2015

(54) METHOD AND APPARATUS FOR CONTROLLING A HYDRAULIC PUMP FOR A MULTIMODE TRANSMISSION OF A POWERTRAIN SYSTEM

(75) Inventors: Poh Fong Chin, Novi, MI (US); Jean Marie Miller, Plymouth, MI (US); Allen J. Lehmen, Howell, MI (US); Valerie Zelko Byrd, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 283 days.

(21) Appl. No.: 13/479,574

(22) Filed: May 24, 2012

(65) Prior Publication Data

US 2013/0316872 A1    Nov. 28, 2013

(51) Int. Cl.
*F16H 61/26*    (2006.01)

(52) U.S. Cl.
USPC .......................................... 477/156

(58) Field of Classification Search
USPC ............ 477/52, 68, 92, 94, 95, 98, 115, 117, 477/156, 168, 169
See application file for complete search history.

(56) References Cited

U.S. PATENT DOCUMENTS

| | | | |
|---|---|---|---|
| 6,736,755 B2* | 5/2004 | Kato | 477/92 |
| 6,769,502 B2* | 8/2004 | Nakamori et al. | 180/65.25 |
| 7,556,120 B2 | 7/2009 | Sah et al. | |
| 7,645,206 B2 | 1/2010 | Holmes et al. | |
| 8,162,797 B2* | 4/2012 | Pursifull | 477/98 |
| 2011/0039657 A1* | 2/2011 | Gibson et al. | 477/115 |
| 2012/0270700 A1* | 10/2012 | Kamioka et al. | 477/167 |
| 2013/0179013 A1* | 7/2013 | Ivacko et al. | 701/22 |

* cited by examiner

*Primary Examiner* — Justin Holmes

(57) ABSTRACT

A powertrain system includes an internal combustion engine configured to execute autostop and autostart operations, and a multi-mode transmission with an electrically-powered hydraulic pump configured to provide pressurized hydraulic fluid to a hydraulic circuit. A Method for controlling operation of the hydraulic pump includes operating the hydraulic pump in a low power mode only when the engine is in an engine-off state, operator inputs to a brake pedal, an accelerator pedal, and a transmission range selector are within allowable states, temperatures of select transmission components are within respective predetermined temperature ranges, and transmission output torque is less than a threshold torque request.

15 Claims, 2 Drawing Sheets

METHOD AND APPARATUS FOR CONTROLLING A HYDRAULIC PUMP FOR A MULTIMODE TRANSMISSION OF A POWERTRAIN SYSTEM

TECHNICAL FIELD

This disclosure is related to hydraulic pump control in powertrain transmission systems.

BACKGROUND

The statements in this section merely provide background information related to the present disclosure. Accordingly, such statements are not intended to constitute an admission of prior art.
Transmission systems include hydraulic distribution systems that control flow of pressurized hydraulic fluid to selected clutch elements to activate and deactivate the clutch elements in response to control signals. The pressurized hydraulic fluid is generated by one or more hydraulic pumps. A hydraulic pump may be mechanically-driven or electrically-driven. Hydraulic pressure levels to activate clutches may require the hydraulic pump to consume greater than 4 kW of power in the form of mechanical or electrical power.

SUMMARY

A powertrain system includes an internal combustion engine configured to execute autostop and autostart operations, and a multi-mode transmission with an electrically-powered hydraulic pump configured to provide pressurized hydraulic fluid to a hydraulic circuit. A Method for controlling operation of the hydraulic pump includes operating the hydraulic pump in a low power mode only when the engine is in an engine-off state, operator inputs to a brake pedal, an accelerator pedal, and a transmission range selector are within allowable states, temperatures of select transmission components are within respective predetermined temperature ranges, and transmission output torque is less than a threshold torque request.

BRIEF DESCRIPTION OF THE DRAWINGS

One or more embodiments will now be described, by way of example, with reference to the accompanying drawings, in which.

DETAILED DESCRIPTION

Figure 1:
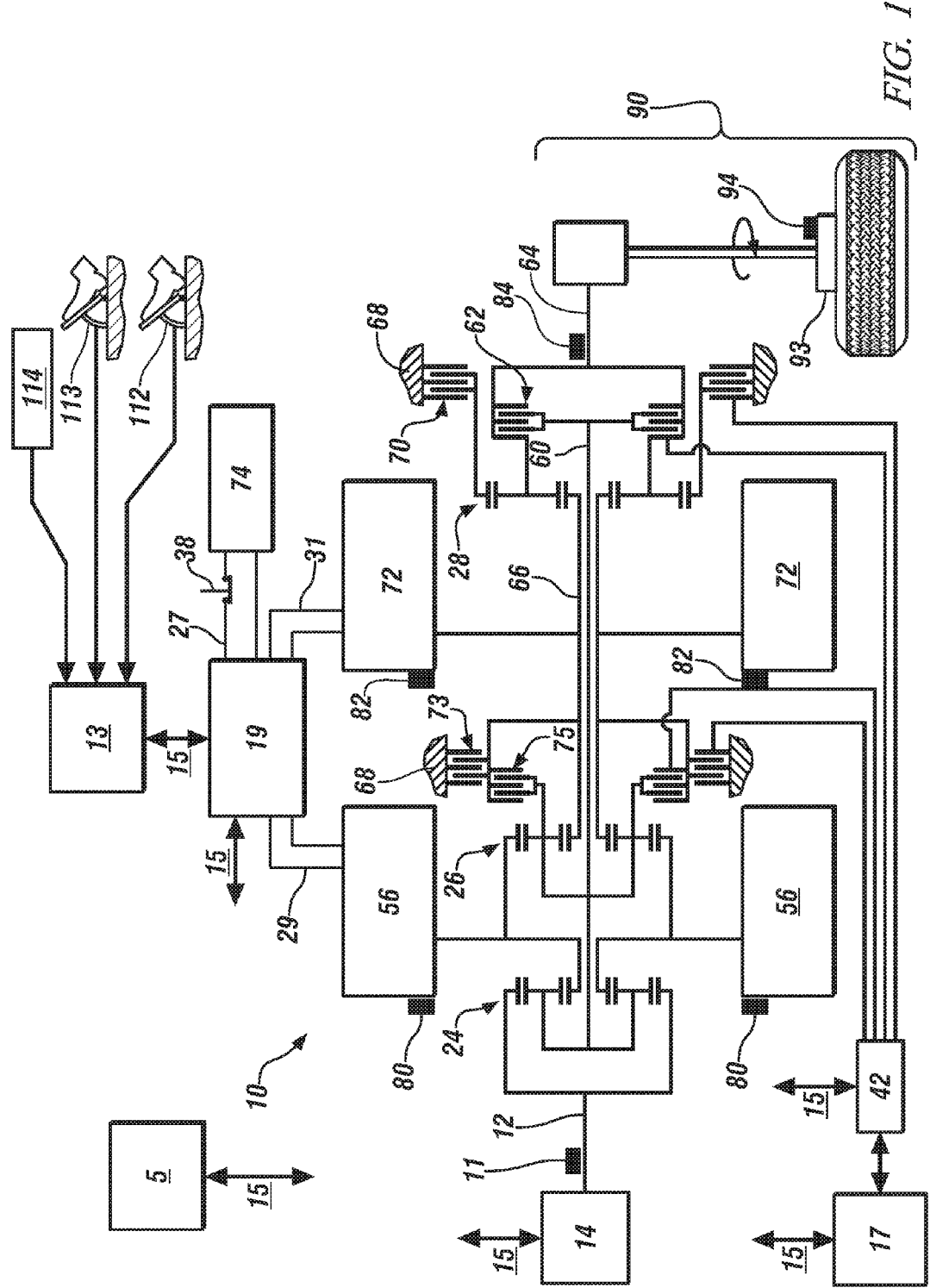
FIG. 1 illustrates a powertrain system including an engine, a multi-mode transmission, a driveline, and a controller, in accordance with the disclosure.

Referring now to the drawings, wherein the showings are for the purpose of illustrating certain exemplary embodiments only and not for the purpose of limiting the same, FIG. 1 depicts a powertrain system including an internal combustion engine (engine) 14, a multi-mode electro-mechanical transmission (transmission) 10, a driveline 90, and a controller 5. The transmission 10 mechanically couples to the engine 14 and includes first and second torque machines 56 and 72, which are electric motor/generators in one embodiment. The engine 14 and first and second torque machines 56 and 72 each generate torque that can be transferred to the transmission 10.

The engine 14 may be any suitable combustion device, and includes a multi-cylinder internal combustion engine selectively operative in several states to transfer torque to the transmission 10 via an input member 12, and can be either a spark-ignition or a compression-ignition engine. The engine 14 includes a crankshaft operatively coupled to the input member 12 of the transmission 10. A rotational speed sensor 11 monitors rotational speed of the input member 12. Power output from the engine 14, i.e., rotational speed and engine torque, can differ from the input speed and the input torque to the transmission 10 due to placement of torque-consuming components on the input member 12 between the engine 14 and the transmission 10, e.g., a torque management device.

The illustrated transmission 10 is a two-mode, compound-split, electro-mechanical transmission 10 that includes three planetary-gear sets 24, 26 and 28, and four engageable torque-transferring devices, i.e., clutches C1 70, C2 62, C3 73, and C4 75. Other multi-mode transmissions may instead be employed. As used herein, clutches refer to torque transfer devices that can be selectively applied in response to a control signal, and may be any suitable devices including by way of example single or compound plate clutches or packs, one-way clutches, band clutches, and brakes. A hydraulic circuit 42 is configured to control clutch states of each of the clutches, with pressurized hydraulic fluid supplied by an electrically-powered hydraulic pump 17 that is operatively controlled by the controller 5. Clutches C2 62 and C4 75 are hydraulically-applied rotating friction clutches. Clutches C1 70 and C3 73 are hydraulically-controlled brake devices that can be grounded to a transmission case 68. Each of the clutches C1 70, C2 62, C3 73, and C4 75 is hydraulically applied using pressurized hydraulic fluid supplied by the hydraulic control circuit 42 in this embodiment. The hydraulic circuit 42 is operatively controlled by the controller 5 to activate and deactivate the aforementioned clutches, provide hydraulic fluid for cooling and lubricating elements of the transmission, and provide hydraulic fluid for cooling the first and second torque machines 56 and 72. Hydraulic pressure in the hydraulic circuit 42 may be determined by measurement using pressure sensor(s), by estimation using on-board algorithms, or using other suitable methods.

The first and second torque machines 56 and 72 are three-phase AC motor/generator machines, each including a stator and a rotor, and respective resolvers 80 and 82. The motor stator for each machine is grounded to an outer portion of the transmission case 68, and includes a stator core with coiled electrical windings extending therefrom. The rotor for the first torque machine 56 is supported on a hub plate gear that is operatively attached to shaft 60 via the second planetary gear set 26. The rotor for the second torque machine 72 is fixedly attached to a sleeve shaft hub 66. Each of the resolvers 80 and 82 is signally and operatively connected to a transmission power inverter control module (TPIM) 19, and each senses and monitors rotational position of the resolver rotor relative to the resolver stator, thus monitoring rotational position of respective ones of first and second torque machines 56 and 72. Additionally, the signals output from the resolvers 80 and 82 may be used to determine rotational speeds for first and second torque machines 56 and 72.

The transmission 10 includes an output member 64, e.g. a shaft, which is rotatably connected to the driveline 90 to provide output power to the driveline 90 that is transferred to vehicle wheels 93, one of which is shown in FIG. 1. The output power at the output member 64 is characterized in terms of an output rotational speed and an output torque. A transmission output speed sensor 84 monitors rotational speed and rotational direction of the output member 64. Each of the vehicle wheels 93 is preferably equipped with a sensor 94 adapted to monitor wheel speed to determine vehicle speed, and absolute and relative wheel speeds for braking control, traction control, and vehicle acceleration management.

The input torque from the engine 14 and the motor torques from the first and second torque machines 56 and 72 are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 preferably includes a pair of power inverters and respective motor control modules configured to receive torque commands and control inverter states for providing motor drive or regeneration functionality to meet the motor torque commands. The power inverters include complementary three-phase power electronics devices, and each includes a plurality of insulated gate bipolar transistors for converting DC power from the ESD 74 to AC power for powering respective ones of the first and second torque machines 56 and 72, by switching at high frequencies. The insulated gate bipolar transistors form a switch mode power supply configured to receive control commands. Each phase of each of the three-phase electric machines includes a pair of insulated gate bipolar transistors. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 56 and 72 for operation as motors or generators via transfer conductors 29 and 31 respectively.

The TPIM 19 transfers electrical power to and from the first and second torque machines 56 and 72 through the pair of power inverters and respective motor control modules in response to the motor torque commands. Electrical current is transmitted to and from the ESD 74 in accordance with whether the ESD 74 is being charged or discharged.

The controller 5 signally and operatively links to various actuators and sensors in the powertrain system via a communications link 15 to monitor and control operation of the powertrain system, including synthesizing information and inputs, and executing algorithms to control actuators to meet control objectives related to fuel economy, emissions, performance, drivability, and protection of hardware, including batteries of ESD 74 and the first and second torque machines 56 and 72. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 19. A user interface 13 is preferably signally connected to a plurality of devices through which a vehicle operator directs and commands operation of the powertrain system. The devices preferably include an accelerator pedal 113, an operator brake pedal 112, a transmission range selector 114 (PRNDL), and a vehicle speed cruise control. The transmission range selector 114 may have a discrete number of operator-selectable positions, including the rotational direction of the output member 64 to enable one of a forward and a reverse direction. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The transmission 10 is configured to operate in one of several states that can be described in terms of engine states including one of an engine-on state (ON) and an engine-off state (OFF), and transmission ranges including fixed gear and variable (EVT) modes, described with reference to Table 1, below.

TABLE 1

| Description | Engine State | Transmission Range | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

The transmission ranges are described in Table 1 indicating the specific applied one(s) of clutches C1 70, C2 62, C3 73, and C4 75 for each of the ranges. For purposes of this description, when the engine state is OFF, the engine input speed is equal to 0 RPM, i.e., the engine crankshaft is not rotating. A fixed gear operation provides a fixed ratio operation of input-to-output speed of the transmission 10. In response to operator input via the accelerator pedal 113, the brake pedal 112, and the transmission range selector 114, as captured by the user interface 13, the control module 5 determines torque commands to control the torque actuators including the engine 14 and the first and second torque machines 56 and 72 to meet the output torque request at the output member 64 for transference to the driveline 90.

Figure 2:
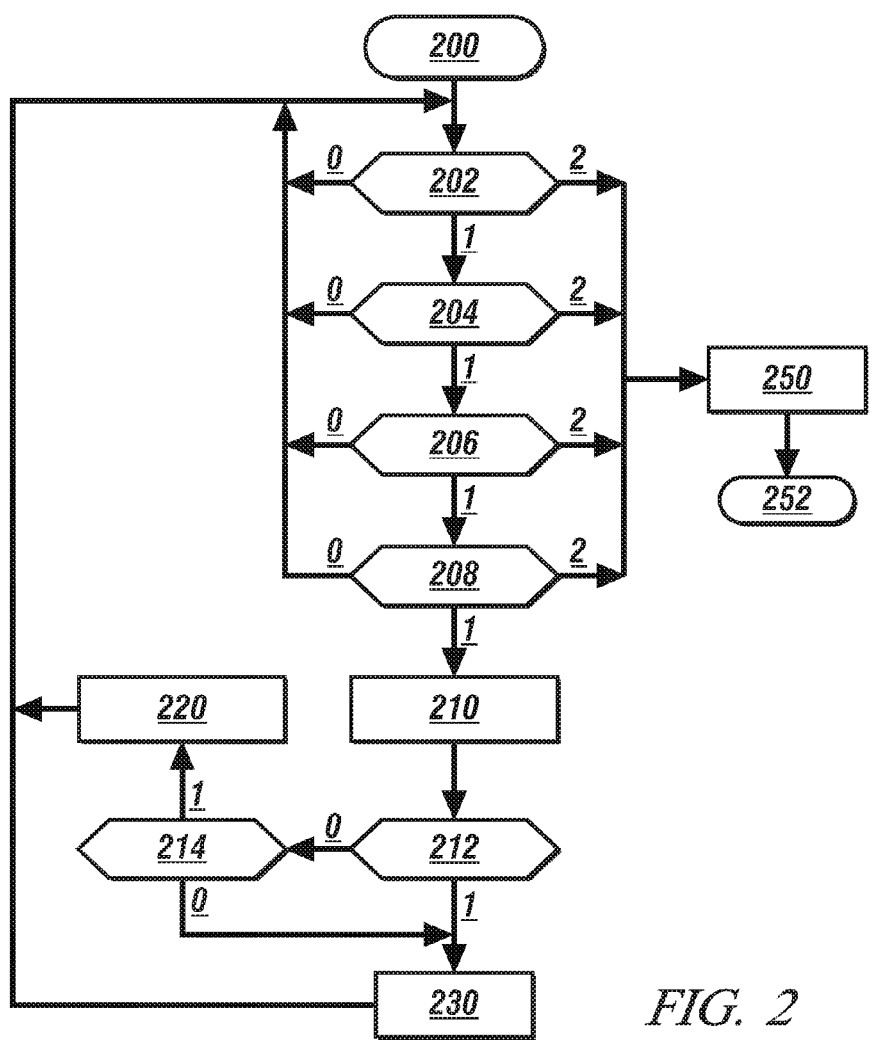
FIG. 2 illustrates a control scheme in flowchart form for controlling operation of an electrically-powered hydraulic pump to provide pressurized hydraulic fluid to a hydraulic circuit of the transmission, in accordance with the disclosure.

FIG. 2 schematically shows a control scheme 200 in flowchart form for controlling operation of the electrically-powered hydraulic pump 17 to provide pressurized hydraulic fluid to the hydraulic circuit 42 of the transmission 10. This includes controlling operation of the hydraulic pump to maintain hydraulic pressure at an activated clutch when operating in an engine OFF mode. The control scheme 200 is described in context of the powertrain system of FIG. 1, but is applicable to other powertrain systems configured to execute engine autostart and autostop operations during powertrain operation. Table 2 provides a key to FIG. 2 wherein the numerically labeled blocks and the corresponding functions are set forth as follows.

TABLE 2

| BLOCK | BLOCK CONTENTS |
| --- | --- |
| 200 | Control scheme |
| 202 | Monitor engine state and pending engine state: effect on operation in hydraulic pump low power mode? |
| 204 | Monitor temperatures of transmission and powertrain elements and fluids: effect on operation in hydraulic pump low power mode? |
| 206 | Monitor operator input to brake pedal and monitor transmission range selector: effect on operation in hydraulic pump low power mode? |
| 208 | Monitor output torque: effect on operation in hydraulic pump low power mode? |
| 210 | Enable operation in one of the hydraulic pump low power modes |
| 212 | Does transmission range selector indicate the Park (P) position is selected? |
| 214 | Is the hydraulic system pressure greater than a minimum threshold with allowable hysteresis? |
| 220 | Operate in the second hydraulic pump low power mode |
| 230 | Operate in the first hydraulic pump low power mode |
| 250 | Discontinue operation in the selected hydraulic pump low power mode |

Under ongoing powertrain operation, the electrically-powered hydraulic pump 17 is controlled to generate pressurized hydraulic fluid in the hydraulic circuit 42 in response to the output torque request as indicated by operator inputs to the accelerator pedal 113 and the brake pedal 112. The control scheme 200 is preferably executed when the transmission 10 is operating in a mode that permits autostart and autostop operations. For the embodiment described with reference to FIG. 1, the transmission 10 is configured to execute autostart and autostop operations when operating in EVT Mode 1 with only clutch C1 70 applied.

The control scheme 200 is executed to determine whether to operate in a hydraulic pump low power mode, and also is executed during operation in a hydraulic pump low power mode to determine whether to discontinue operation in the hydraulic pump low power mode. There may be multiple hydraulic pump low power modes, and thus the control scheme 200 provides a process for selecting a specific one of the hydraulic pump low power modes. Hydraulic pump low power modes, as the term is used herein, means one of a disabled electrically-powered hydraulic pump (i.e. drawing no current) or operating an electrically-powered hydraulic pump sufficient to maintain trapped hydraulic pressure within an activated clutch, accounting for normal hydraulic fluid leak down.

The control scheme 200 initially monitors the engine state, i.e., whether ON or OFF, and determines if there is an effect on operation in a hydraulic pump low power mode, including determining whether there is a pending engine autostart request (202). When it is determined that the engine is in the ON state prior to operating in one of the hydraulic pump low power modes (202)(0), the control scheme 200 continues to monitor the engine state. When it is determined that the engine is in the ON state or there is a pending engine autostart request while operating in one of the hydraulic pump low power modes (202)(2), the control scheme 200 discontinues operation in the selected hydraulic pump low power mode (250), and controls the hydraulic pump in response to the output torque request (252). When an autostop command has been executed placing the engine in the OFF state and there is no pending engine-ON request (202)(1), the control scheme 200 proceeds to the next block (204).

Temperatures of a plurality of powertrain elements are monitored, including transmission components of interest and hydraulic fluids to determine the effect on operation in hydraulic pump low power mode (204). Temperatures of the hydraulic pump 17, the first and second torque machines 56 and 72, and the transmission fluid, for example, are preferably monitored. The temperatures of the hydraulic pump 17 and the first and second torque machines 56 and 72 are compared to respective maximum and minimum allowable temperatures. The temperature of the transmission fluid is compared to a respective minimum allowable temperature. The transmission fluid is monitored to exclude operating when the transmission fluid is cold to minimize delays in hydraulic response at cold temperatures. When the monitored temperatures of the transmission components are between their respective minimum and maximum thresholds with allowable hysteresis bands and the transmission fluid temperature is greater than its minimum threshold (204)(1), the control scheme 200 proceeds to the next block (206). When it is determined that the monitored temperatures of one or more of the transmission components of interest is greater than its maximum threshold or less than its minimum threshold, or the transmission fluid temperature is less than its minimum threshold prior to operating in one of the hydraulic pump low power modes (204)(0), monitoring continues to determine whether the remaining entrance criteria are subsequently met. When it is determined that the monitored temperatures of one or more of the transmission components of interest is greater than its maximum threshold or less than its minimum threshold, or the transmission fluid temperature is less than its minimum threshold while operating in one of the hydraulic pump low power modes (204)(2), the control scheme 200 discontinues operation in the selected hydraulic pump low power mode (250), and controls the hydraulic pump in response to the output torque request (252).

Figure 3:
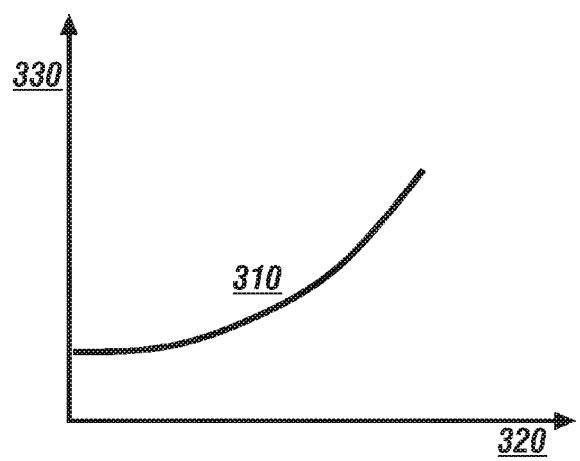
FIG. 3 illustrates a calibration curve including transmission output speed in relation to brake pedal travel, in accordance with the disclosure.

The next block includes monitoring operator brake input via the operator brake pedal 112 to determine effect on operation in one of the hydraulic pump low power modes. This is preferably coupled with monitoring the transmission range selector for position in Park (P). The operator brake input is preferably measured as brake pedal travel in relation to the transmission output speed at output member 64 (206). When it is determined that brake pedal travel in relation to the transmission output speed is greater than the threshold with allowable hysteresis (206)(1), the control scheme 200 proceeds to the next block (208) to determine whether the remaining entrance criteria are subsequently met prior to permitting operation in one of the hydraulic pump low power modes. FIG. 3 graphically depicts a calibration curve 310 including transmission output speed 320 on the horizontal-axis in relation to brake pedal travel (%) 330 in the vertical-axis. The calibration curve 310 indicates a minimum allowable brake pedal travel in relation to the transmission output speed to permit operation in one of the hydraulic pump low power modes. Furthermore, when the transmission range selector is in the Park (P) position, operation in one of the hydraulic pump low power modes is permissible regardless of the magnitude of the brake pedal travel. When it is determined that brake pedal travel in relation to transmission output speed is less than its threshold with allowable hysteresis while operating in one of the hydraulic pump low power modes (206)(2), the control scheme 200 discontinues operation in the selected hydraulic pump low power mode (250), and controls the hydraulic pump in response to the output torque request (252). When it is determined that brake pedal travel in relation to transmission output speed is less than its threshold with allowable hysteresis prior to operating in one of the hydraulic pump low power modes (206)(0), the control scheme 200 continues monitoring to determine whether the remaining entrance criteria are subsequently met.

The next block includes monitoring the output torque request to determine its effect on operation in the hydraulic pump low power mode (208). Prior to operating in one of the hydraulic pump low power modes, when it is determined that transmission output torque request is greater than a threshold with allowable hysteresis or the change in the output torque request is greater than the rate of change (208)(0), monitoring continues to determine whether the remaining entrance criteria are subsequently met. When it is determined that the transmission output torque request is greater than its threshold with allowable hysteresis or the change in the output torque request is greater than the rate of change while operating in one of the hydraulic pump low power modes (208)(2), the control scheme 200 discontinues operation in the selected hydraulic pump low power mode (250), and controls the hydraulic pump in response to the output torque request (252). When the output torque request is less than its threshold, within allowable hysteresis and a change in the output torque request is less than a rate of change (208)(1), the control scheme 200 proceeds to the next block (210).

The aforementioned blocks 202, 204, 206, and 208 are described as being executed in a consecutive or stepwise fashion. Blocks 202, 204, 206, and 208 may be executed in any suitable order and any suitable manner, including simultaneous execution or paired execution.

Operation in one of the hydraulic pump low power modes is enabled when all of the foregoing conditions are met (210). The transmission range selector 114 (PRNDL) is monitored (212), and when it indicates the Park (P) position is selected (212)(1), a first of the hydraulic pump low power modes is selected (230). When the transmission range selector 114 indicates the Park (P) position is not selected (212)(0), the hydraulic system pressure is monitored (214). When the hydraulic system pressure is greater than a minimum threshold with allowable hysteresis (214)(0), the first of the hydraulic pump low power modes is selected (230). When the hydraulic system pressure is less than the minimum threshold with allowable hysteresis (214)(1), a second of the hydraulic pump low power modes is selected (220).

The first hydraulic pump low power mode (230) includes commanding the hydraulic pump to an OFF state and relying upon the hydraulic circuit 42 to maintain the hydraulic pressure above a threshold pressure. An OFF state of the hydraulic pump corresponds to a disabled hydraulic pump. The second hydraulic pump low power mode (220) includes commanding the hydraulic pump to operate to a minimum pressure to overcome leakdown in the hydraulic system associated with applying clutch C1 70, which is associated with Mode 1 operation. The operation of the control scheme 200 improves control of the electrically-powered hydraulic pump 17, allowing for management of the electrical load including reducing the electrical load during urban driving thus improving fuel economy.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling operation of an electrically-powered hydraulic pump configured to provide pressurized hydraulic fluid to a hydraulic circuit of a transmission of a powertrain system including an internal combustion engine configured to execute autostop and autostart operations, the method comprising:
   operating the hydraulic pump in a low power mode when the engine is in an engine-off state and an output torque request is less than a predetermined threshold torque request;
   discontinuing operating the hydraulic pump in the low power mode when an operating temperature of at least one predetermined transmission component is outside of a respective predetermined temperature range; and
   discontinuing operating the hydraulic pump in the low power mode in response to a command to autostart the engine, and subsequently controlling the hydraulic pump in response to the output torque request.

2. The method of claim 1, wherein operating the hydraulic pump in the low power mode comprises disabling operation of the hydraulic pump.

3. The method of claim 1, wherein operating the hydraulic pump in the low power mode comprises operating the hydraulic pump to control hydraulic pressure to a minimum threshold pressure.

4. The method of claim 1, further comprising discontinuing operating the hydraulic pump in the low power mode when an operator brake input is less than a predetermined threshold brake input.

5. The method of claim 1, further comprising discontinuing operating the hydraulic pump in the low power mode when an operating temperature of at least one predetermined transmission component is outside of a respective predetermined temperature range or when an operator brake input is less than a predetermined threshold brake input.

6. The method of claim 1, wherein operating the hydraulic pump in the low power mode comprises disabling operation of the hydraulic pump if a transmission range selector is in Park.

7. The method of claim 1, operating the hydraulic pump in the low power mode comprises operating the hydraulic pump to control hydraulic pressure to a minimum threshold pressure if a transmission range selector is not in Park and the pressurized hydraulic fluid is below a predetermined minimum fluid pressure.

8. The method of claim 1, operating the hydraulic pump in the low power mode comprises disabling operation of the hydraulic pump if a transmission range selector is not in Park and the pressurized hydraulic fluid is above a predetermined minimum fluid pressure.

9. Method for controlling operation of an electrically-powered hydraulic pump configured to provide pressurized hydraulic fluid to a hydraulic circuit of a multi-mode transmission of a powertrain system including an internal combustion engine configured to execute autostop and autostart operations, the method comprising operating the hydraulic pump in a low power mode only when the engine is in an engine-off state, operator input to a brake pedal is greater than a predetermined threshold brake input, operator input to an accelerator pedal is less than a predetermined threshold accelerator pedal input, temperatures of select transmission components are within respective predetermined temperature ranges, and transmission output torque is less than a threshold torque request.

10. The method of claim 9, wherein operating the hydraulic pump in the low power mode comprises disabling operation of the hydraulic pump.

11. The method of claim 9, wherein operating the hydraulic pump in the low power mode comprises operating the hydraulic pump to control hydraulic pressure to a minimum threshold pressure.

12. The method of claim 9, further comprising controlling the hydraulic pump to increase the hydraulic pressure in response to a command to autostart the engine.

13. The method of claim 9, further controlling the hydraulic pump in response to the output torque request subsequent to said increasing the hydraulic pressure in response to the command to autostart the engine.

14. Method for controlling operation of an electrically-powered hydraulic pump configured to provide pressurized hydraulic fluid to a hydraulic circuit of a transmission of a powertrain system including an internal combustion engine configured to execute autostop and autostart operations, the method comprising:
 when the engine is in an engine-off state and for so long as a predetermined set of conditions are satisfied, the conditions comprising temperatures of select transmission components within respective predetermined temperature ranges, an operator brake input greater than a predetermined threshold brake input, and an operator torque request less than a predetermined threshold torque request,
  operating the hydraulic pump in a first low power mode comprising disabling the hydraulic pump when a transmission range selector is in Park, and
  operating the hydraulic pump in a second low power mode comprising operating the hydraulic pump to control hydraulic pressure to a minimum threshold pressure when the transmission range selector is not in Park and the pressurized hydraulic fluid is below a predetermined minimum fluid pressure.

15. The method of claim 14, wherein operating the hydraulic pump in the first low power mode further comprises disabling the hydraulic pump when the transmission range selector is not in Park and the pressurized hydraulic fluid is not below the predetermined minimum fluid pressure.

\* \* \* \* \*